No. 836,825. PATENTED NOV. 27, 1906.
F. J. PELLOWSKI.
ATTACHMENT TO THRESHING MACHINE SIEVES.
APPLICATION FILED FEB. 23, 1906.
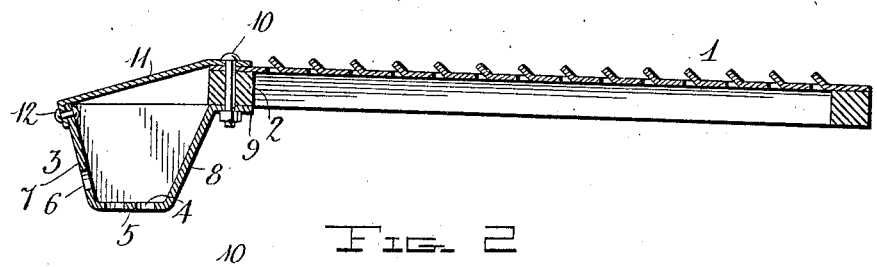
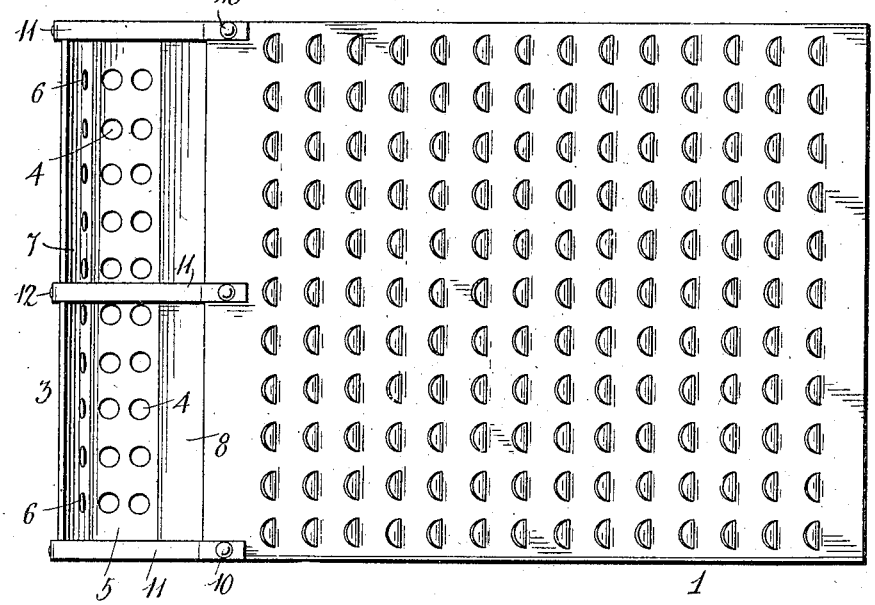
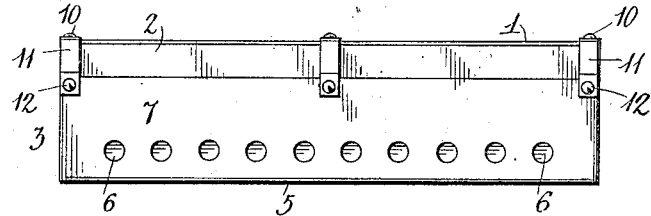
Witnesses  
Inventor  
Frank J. Pellowski  
by H. B. Willson & Co.  
Attorneys

UNITED STATES PATENT OFFICE.

FRANK J. PELLOWSKI, OF ARCADIA, WISCONSIN.

ATTACHMENT TO THRESHING-MACHINE SIEVES.

No 836,825.　　　　Specification of Letters Patent.　　　　Patented Nov. 27, 1906.

Application filed February 23, 1906. Serial No. 302,468.

*To all whom it may concern:*

Be it known that I, FRANK J. PELLOWSKI, a citizen of the United States, residing at Arcadia, in the county of Trempealeau and State of Wisconsin, have invented certain new and useful Improvements in Attachments to Threshing-Machine Sieves; and I do declare the following to be a full, clear, and exact description of the invention, such as will enable others skilled in the art to which it appertains to make and use the same.

My invention relates to improvements in threshing-machines, and more particularly to the sieves or screens thereof.

The object of the invention is to provide a simple and inexpensive device which may be readily attached to a thresher-machine sieve to catch broken thresher-teeth or other hard objects which might when passing off of the sieve be returned by the elevator to the thresher-cylinder and cause damage.

With the above and other objects in view the invention consists of certain novel features of construction, combination, and arrangement of parts hereinafter described and claimed.

In the accompanying drawings, Figure 1 is a transverse sectional view through my improved attachment, showing it applied to a thresher-sieve. Fig. 2 is a top plan view of the same, and Fig. 3 is a view of the outer side of the attachment.

Referring to the drawings by numeral, 1 denotes the usual sieve of a threshing-machine, which has removably secured upon its rear or outer cross-bar 2 my attachment 3. The latter is in the form of a transversely-extending trough of substantially U form in cross-section and preferably constructed of sheet metal, bent as shown and perforated with two or more rows of perforations 4 in its bottom 5 and a row of perforations 6 in its outer side 7 adjacent to its bottom. Its inner side 8 has an angularly-bent flange 9, which engages the under face of the cross-bar 2 of the sieve-frame and is apertured to receive fastening-bolts 10. The latter pass vertically through the cross-bar 2 and through the perforated inner ends of straps or braces 11, which have their rear ends riveted or otherwise secured, as at 12, to the upper edge of the outer side 7 of the trough. The openings or perforations 4 6 in the trough are of sufficient size to permit the chaff to drop through the same, but prevent the passage of broken thresher-teeth or any hard substances that are of sufficient size to injure the thresher-cylinder and its concave should they be returned thereto by the usual elevator upon the machine.

From the foregoing description, taken in connection with the accompanying drawings, the construction, operation, and advantages of the invention will be readily understood without requiring a more extended explanation.

Various changes in the form, proportion, and the minor details of construction may be resorted to without departing from the principle or sacrificing any of the advantages of the invention as defined by the appended claim.

Having thus described my invention, what I claim as new, and desire to secure by Letters Patent, is—

The combination with a threshing-machine sieve having a rear cross-bar, of a transversely-extending, open-top trough of substantially U form in cross-section, adapted to receive grain and heavy material passing over the screen, provided in its bottom and one side with openings of a size adapted to pass grain but retain heavy foreign material of a size larger than grain, having upon the upper edge of its inner side an angularly-projecting attaching-flange adapted to engage the under face of said cross-bar, and straps or brackets secured at their outer ends to the outer side of said trough and having their inner ends engaged with the upper face of said cross-bar, and fastening-bolts or the like passed through said straps, said cross-bar and said attaching-flange, said straps, flange and bolts securing the trough to the sieve for movement therewith.

In testimony whereof I have hereunto set my hand in presence of two subscribing witnesses.

FRANK J. PELLOWSKI.

Witnesses:
　EMIL SCOW,
　IVAN HENSEL